(12) United States Patent
Beierle

(10) Patent No.: US 7,218,892 B2
(45) Date of Patent: May 15, 2007

(54) PASSIVE REPEATER/TERMINATOR

(75) Inventor: Robert T. Beierle, Bar, CA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 10/607,792

(22) Filed: Jun. 27, 2003

(65) Prior Publication Data
US 2004/0266346 A1 Dec. 30, 2004

(51) Int. Cl.
H04B 7/185 (2006.01)

(52) U.S. Cl. ............... 455/13.4; 327/308; 327/309; 324/722; 324/723

(58) Field of Classification Search ............... 455/13.4, 455/118; 327/306, 308–309; 324/714, 722, 324/723
See application file for complete search history.

(56) References Cited

U.S. PATENT DOCUMENTS

2005/0258870 A1* 11/2005 Mitby et al. ................. 326/87

2007/0014131 A1* 1/2007 Oh et al. ................. 363/21.05

* cited by examiner

Primary Examiner—Tuan Dinh
Assistant Examiner—Hung S. Bui
(74) Attorney, Agent, or Firm—Robert R. Richardson, P.S.

(57) ABSTRACT

A passive terminator between a plurality of nodes includes a first voltage divider configured to passively set a differential voltage level between a first voltage level and a second voltage level. The first voltage divider has a Thevenin resistance and is electrically connectable to a first node. At least a second voltage divider is configured to passively set the differential voltage level between the first voltage level and the second voltage level. The second voltage divider has the Thevenin resistance and is electrically connectable to at least a second node. A transformer is electrically connected between the first voltage divider and the at least second voltage divider. The transformer has a reactance that is substantially greater than the Thevenin resistance of the first voltage divider and the at least second voltage divider.

37 Claims, 2 Drawing Sheets

PASSIVE REPEATER/TERMINATOR

GOVERNMENT LICENSE RIGHTS

This invention was made with Government support under U.S. Government contract N00024-00-C-6103 awarded by the U.S. Navy. The Government has certain rights in this invention.

FIELD OF THE INVENTION

The present invention relates generally to electrical interfaces and, more specifically, to passive electrical interfaces.

BACKGROUND OF THE INVENTION

Two-way serial communications in electrical systems are accomplished, in part, with electrical interfaces between nodes. For example, a controller area network or carrier area-wide network (both hereinafter referred to as "CAN") provides two-way serial communications via electrically-conductive wire according to CAN standard ISO 11898-2. The communications are provided between CAN transmitter receiver nodes. Electrical interfaces, such as repeaters and/or terminators, are provided between the nodes to match impedance and provide operating voltage levels that comply with the CAN standard.

In some applications, the nodes may be electrically connected by long cabling runs that may be up to 1 kilometer or so long. As a result, signals are driven by a driver in order to overcome losses over long distances. In this event, active repeater/terminators are provided to receive signals, buffer the signals, and transmit the signals.

Active repeater/terminators provide good drive over long distances. However, active repeater/terminators include relatively complex, active electronic circuitry. The active circuitry of one commercially-available active repeater/terminator requires external power and is galvanically isolated between channels. A level of active arbitration is required for mitigation of data path selection, thereby adding further complexity to the active repeater/terminator. Another commercially-available active repeater/terminator uses an optical coupler and provides optical isolation. However, drive capability is limited and external power is required. Both of these commercially-available active repeater/terminators have a relatively large size, generate heat, and consume processing resources. As a result, both of these active repeater/terminators are complex, suffer from reliability concerns, and are relatively expensive.

In other applications, it may be desirable to transmit a signal to multiple destinations and receive data back from the multiple destinations. Some of these applications may entail short signal paths. Therefore, it is not necessary to actively drive signals between nodes. It would be desirable to provide repeater/terminators that do not entail external power supplies, complexity, costs, reliability, and other concerns of active repeater/terminators. However, there is an unmet need in the art for a passive repeater/terminator.

SUMMARY OF THE INVENTION

The present invention provides a passive terminator between a plurality of nodes. Advantageously, embodiments of the present invention passively match impedance between the plurality of the nodes and passively set an operating differential voltage level according to a standard that may be used as desired. As a result, the present invention provides a passive terminator that is simple, inexpensive, compact, and that does not consume processing resources that are consumed by active terminators or require an external power supply.

According to one embodiment of the present invention, a passive terminator between a plurality of nodes includes a first voltage divider configured to passively set a differential voltage level between a first voltage level and a second voltage level. The first voltage divider has a Thevenin resistance and is electrically connectable to a first node. At least a second voltage divider is configured to passively set the differential voltage level between the first voltage level and the second voltage level. The second voltage divider has the Thevenin resistance and is electrically connectable to at least a second node. A transformer is electrically connected between the first voltage divider and the at least second voltage divider. The transformer has a reactance that is substantially greater than the Thevenin resistance of the first voltage divider and the at least second voltage divider.

According to an aspect of the invention, the passive terminator may be used with CAN standard-compliant transmitter/receivers. In this case, the first voltage is an active voltage level of around 3.75 volts DC for driving a transmitter/receiver, and the second voltage level is an idle voltage of around 1.25 volts DC for permitting the transmitter/receiver to remain in a quiescent state.

According to another aspect of the invention, the passive terminator may be used with Ethernet transmitter/receivers. In this case, the first voltage is an active, non-ground voltage level for driving a transmitter receiver, and the second voltage level is an idle, ground voltage for permitting the transmitter/receiver to remain in a quiescent state.

According to a further aspect of the invention, the transformer suitably is a pulse transformer. Magnitude of reactance of the pulse transformer may be at least an order of magnitude higher than magnitude of the Thevenin resistance of the first voltage divider and the at least second voltage divider.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention provides a passive terminator between a plurality of nodes. Advantageously, embodiments of the present invention passively match impedance between the plurality of the nodes and passively set an operating differential voltage level according to a standard that may be used. As a result, the present invention provides a passive terminator that is simple, inexpensive, compact, and that does not consume processing resources that are consumed by active terminators.

Figure 1:
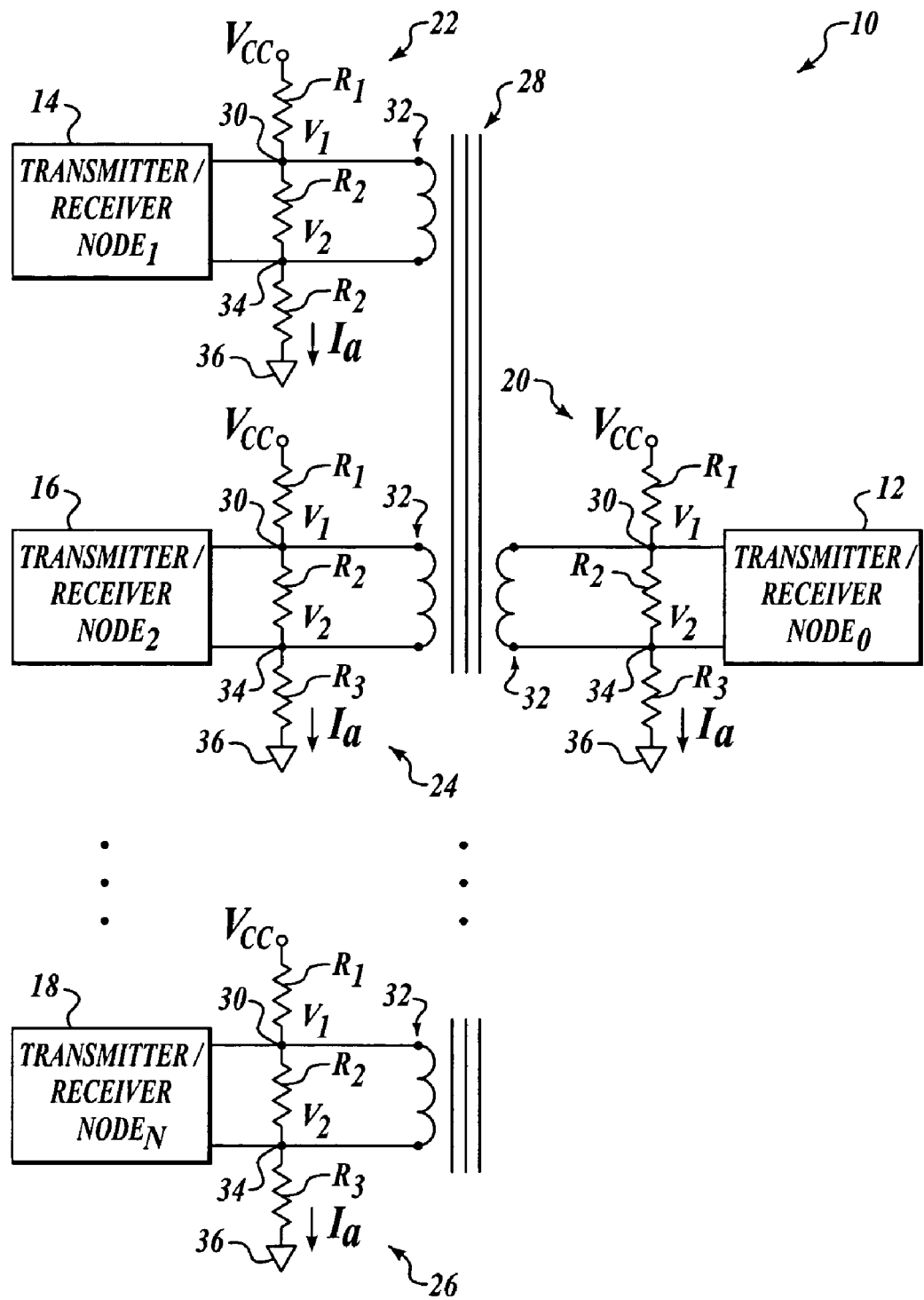
FIG. 1 is a schematic diagram of a passive terminator according to an embodiment of the present invention.

Referring now to FIG. 1 and by way of introduction, according to an exemplary embodiment of the present invention, a passive terminator 10 between a plurality of nodes 12, 14, 16, and 18 includes a voltage divider 20 that is configured to passively set a differential voltage level between a first voltage level $V_1$ and a second voltage level $V_2$. The voltage divider 20 has a Thevenin resistance $R_T$ and is electrically connectable to the node 12. Voltage dividers 22, 24, and 26 are configured to passively set the differential voltage level between the first voltage level $V_1$ and the second voltage level $V_2$. The voltage dividers 22, 24, and 26 have the Thevenin resistance $R_T$ and are electrically connectable to the nodes 14, 16, and 18. A transformer 28 is electrically connected between the voltage divider 20 and the voltage dividers 22, 24, and 26. The transformer 28 has a reactance $X_L$ that is substantially greater than the Thevenin resistance $R_T$ of the voltage dividers 20, 22, 24, and 26. Details of the exemplary terminator 10 are set forth below.

The terminator 10 advantageously provides a passive repeater/terminator that permits two-way serial communications between the node 12 and the nodes 14, 16 and 18. It will be appreciated that the number of nodes shown in FIG. 1 is given by way of non-limiting example. The terminator 10 may be configured to operate with as few nodes as the nodes 12 and 14—that is, one node on each side of the transformer 28. On the other hand, the terminator 10 may just as suitably be configured to operate with as many nodes as desired for a particular application.

According to the present invention, the passive terminator 10 advantageously may be used instead of more complex, more expensive, and less reliable active repeater/terminators known in the art when lengths of connections between the nodes 12, 14, 16, and 18 are relatively short, such as on the order of less than around 5 meters or so to less than around 10 meters or so. However, a precise demarcation of lengths for which the terminator 10 is suitable is not important. Instead, it is sufficient that the terminator 10 is advantageously used when signals do not have to be driven over long distances.

In an exemplary embodiment, the node 12 is a transmitter/receiver (designated as $node_0$). The node 12 transmits and receives signals via serial two-way communications with at least one transmitter/receiver, such as without limitation the node 14 (designated as $node_1$). As mentioned above, as many other transmitter/receivers may be used with the terminator 10 as desired. That is, it will be appreciated that the terminator 10 is not limited to use with only the nodes 12, 14, 16, and 18, as shown in FIG. 1. Rather, any number of nodes may be used, as desired for a particular purpose. It will be further appreciated that the nodes 12, 14, 16, and 18 are not components of the terminator 10. Rather, the terminator 10 is configured for use with the nodes 12, 14, 16, and/or 18, as desired. Furthermore, it will be appreciated that operating characteristics, such as without limitation impedance, active voltage level, and idle voltage level, of the transmitter/receivers at the nodes 12, 14, 16, and 18 are substantially the same.

The nodes 12, 14, 16, and 18 are transmitter/receivers that use termination and that have a differential voltage level between an active voltage level and an idle voltage level. For example, in one exemplary embodiment, the nodes 12, 14, 16, and 18 suitably are CAN standard-compliant transmitter/receivers. As such, the transmitter/receivers have an impedance of around 100 ohms or so. In addition, the transmitter/receivers are driven at an active voltage level of around 3.75 volts DC. The transmitter/receivers have an idle voltage level of around 1.25 volts DC that permit the transmitter/receivers to remain in a quiescent state. CAN standard-compliant transmitter/receivers are well known in the art. As a result, a detailed description of their construction and operation is not necessary for an understanding of the present invention.

In alternate embodiments, the nodes 12, 14, 16, and 18 suitably are Ethernet transmitter/receivers, Gigabit Ethernet transmitter/receivers, RS-232 transmitter/receivers, or the like. In these alternate embodiments, the transmitter/receivers are driven at different active voltage levels that appropriate for a particular standard. For example, an RS-232 transmitter/receiver may have an active voltage level between around −6 volts DC and around −12 volts DS, and typically may be around −8 volts DC. However, the transmitter/receivers have an idle voltage level of ground that permits the transmitter/receivers to remain in a quiescent state. Ethernet transmitter/receivers, Gigabit Ethernet transmitter/receivers, and RS-232 transmitter/receivers are well known in the art. As a result, a detailed description of their construction and operation likewise is not necessary for an understanding of the present invention.

The voltage dividers 20, 22, 24, and 26 advantageously all have the same Thevenin resistance $R_T$ and passively set the same active voltage $V_1$ and idle voltage $V_2$. As such, it is not necessary that all the voltage dividers 20, 22, 24, and 26 have identical construction. However, to minimize cost and complexity, in one presently preferred embodiment, the voltage dividers 20, 22, 24, and 26 have the same construction. For sake of brevity, construction and operation of only one of the voltage dividers will be discussed herein.

The voltage divider 12 passively sets the active voltage $V_1$ and the idle voltage $V_2$. A resistor $R_1$ is coupled at a first terminal to a voltage source $V_{cc}$. Given by way of non-limiting example, the voltage source $V_{cc}$ may be around 12 volts DC when the nodes 12, 14, 16, and 18 are CAN transmitter/receivers. A second terminal of the resistor $R_1$ is coupled to a node 30. A first terminal of the node 12 is coupled to the node 30. Also, a first terminal of a winding 32 of the transformer 28 is coupled to the node 30. It will be appreciated that the transformer 28 suitably has a winding ratio of 1:1 (sometimes referred to as a "pulse transformer"). That is, the transformer 28 is used to galvanically isolate the node 12 from the nodes 14, 16, and 18 instead of being used to step up or step down signals.

A first terminal of a resistor $R_2$ is coupled to the node 30, and a second terminal of the resistor $R_2$ is coupled to a node 34. A second terminal of the winding 32 is also coupled to the node 34. A first terminal of a resistor $R_3$ is coupled to the node 34, and a second terminal of the resistor $R_3$ is coupled to a potential 36. In an exemplary embodiment, the potential 36 suitably is ground.

Selection of values of components of the voltage divider 20 and circuit analysis of the voltage divider 20 will be made with reference to FIGS. 1 and 2. The signals transmitted and received by the nodes 12, 14, 16, and 18 are high frequency signals, with a typical data rate on the order of around 500 KHz or so. In addition, the signals are biased by the active voltage $V_1$ when the nodes 12, 14, 16, or 18 are turned on to transmit or receive the signals. Thus, circuit analysis of the voltage divider 20 entails both DC circuit analysis and AC circuit analysis. The AC circuit analysis will be made with reference to FIG. 2 and by treating the voltage source $V_{cc}$ and the potential 36 as AC grounds.

Impedance is sufficiently matched by selecting the reactance $X_L$ of the transformer 28 to be much greater than the Thevenin resistance $R_T$ of the voltage divider 20. Because high frequency AC signals are transmitted and received via the voltage divider 20 (that includes inductive and resistance components), impedance of the voltage divider 20 is complex. That is, impedance of the voltage divider 20 includes real and imaginary components. Advantageously, according to the invention, the reactance $X_L$ is selected to be much greater than the Thevenin resistance $R_T$. The reactance $X_L$ suitably is selected to be at least ten times (that is, at least one order of magnitude) the Thevenin resistance $R_T$. As a result, for AC circuit analysis purposes, the winding 32 may be considered to be an open circuit across the resistor $R_2$. Given by way of nonlimiting example, assuming that the Thevenin resistance $R_T$ is around 100 ohms and the data rate is around 500 MHz, inductance L of the winding 32 can be determined according to the equation $$X_L = 2 \times pi \times fL$$

where:

$X_L = 10 \times 100$ ohms $= 1,000$ ohms; and $f = 500$ MHz.

Therefore, the Thevenin equivalent of the reactance $X_L$ appears large compared to the Thevenin resistance $R_T$. As a result, according to the present invention input impedance of the nodes 12, 14, 16, and 18 can be matched by controlling values of the resistors $R_1$, $R_2$, and $R_3$. It will be appreciated that, if desired, $X_L$ can be selected as a lower value to more precisely match input impedance of the nodes 12, 14, 16, and 18 and to reduce size of the transformer 28. The size of the transformer 28 may be reduced because reactance is proportional to number of windings; by reducing the number of windings, size of the transformer 28 is thereby reduced. However, this leads to a more complex solution than that described herein. This is because deriving values for the resistors $R_1$, $R_2$, and $R_3$ is more difficult when the reactance $X_L$ cannot be ignored.

Figure 2:
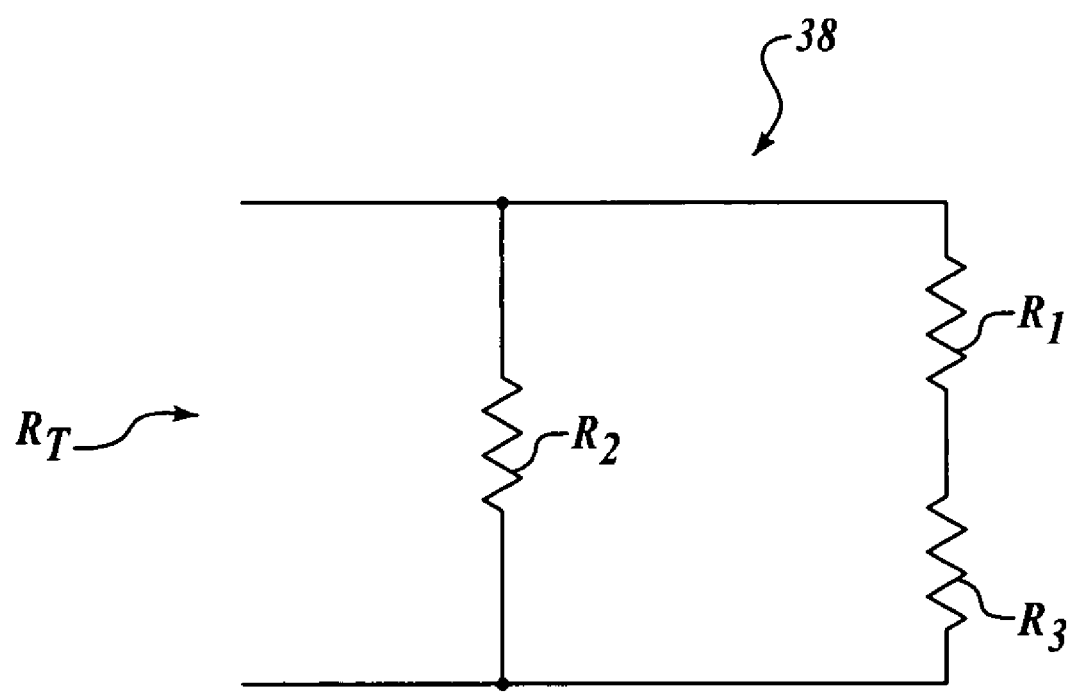
FIG. 2 is a schematic diagram of an AC-equivalent circuit of a portion of the passive terminator of FIG. 1.

Because the voltage source Vcc and the potential 36 may be considered AC signal grounds and the winding 32 may be considered to be an open circuit across the resistor $R_2$, an AC signal equivalent circuit 38 is shown in FIG. 2. In the AC signal equivalent circuit, the resistors $R_1$ and $R_3$ are connected in series. The series-connection of the resistors R1 and R3 are connected in parallel across the resistor $R_2$.

According to an embodiment of the present invention, values for the resistors R1, R2, and R3 are determined as follows. Referring now to FIG. 1:

Let $R_1 + R_2 + R_3 = R_a$, where $R_a$ is a DC resistance.

Then, $R_a = V_{cc}/I_a$.

$$V_1 = V_{cc}(R_2+R_3)/(R_1+R_2+R_3) = V_{cc}(R_2+R_3)/R_a \text{ or } (R_1+R_3) = V_1 R_a/V_{cc}; \text{ and} \quad (1)$$

$$V_2 = V_{cc} R_3/R_a \text{ or } R_3 = V_2 R_a/V_{cc} \quad (2)$$

Referring now to FIG. 2:

$$R_T = R_2(R_1+R_3)/R_a, \text{ or}$$

$$R_T = I_a R_2(R_1+R_3)/V_{cc}. \quad (3)$$

Referring now to FIGS. 1 and 2:

From Equation (1), $R_2 + V_2 R_a/V_{cc} = V_1 R_a/V_{cc}$.

Therefore, $R_2 = R_a(V_1-V_2)/V_{cc}$.

From Equation (3), $R_T = I_a R_2(R_1+R_3)/V_{cc} = (I_a R_2 R_1 + I_a R_2 R_3)/V_{cc}$;

$V_{cc} R_T - I_a R_2 R_3 = I_a R_2 R_1$; and therefore $R_1 = (R_T V_{cc} - I_a R_2 R_3)/I_a R_2$.

By substitution, $R_3 = V_2 R_a/V_{cc}$ and $R_2 = R_a(V_1-V_2)/V_{cc}$.

Therefore, $R1 = R_T V_{cc} - I_a[R_a(V_1-V_2)V_2 R_a/V_{cc}]/I_a R_a(V_1-V_2)/V_{cc}$.

Finally, $R_1 = [R_T V_{cc}^2/I_a R_a(V_1-V_2)] - R_a V_2$.

The exemplary terminator 10 may experience a signal loss of around 40 percent. Around a −1.5 db transformer insertion lass may be experienced, as well as around a −3 db power loss due to division of power. Therefore, Signal loss $SL_{db} = 20 \text{ LOG}_{10}[V_{in}/V_{out}]$ for a −4.5 db loss (signal loss plus insertion loss). This yields about a 40 percent signal loss. Advantageously, this provides a drive capability of around five meters to around eight meters.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A passive terminator between a plurality of nodes, the terminator comprising:

a first voltage divider configured to passively set a differential voltage level between a first voltage level and a second voltage level, the first voltage divider having Thevenin resistance and being electrically connectable to a first node;

at least a second voltage divider configured to passively set the differential voltage level between the first voltage level and the second voltage level, the at least second voltage divider having the Thevenin resistance and being electrically connectable to at least a second node; and a transformer electrically connected between the first voltage divider and the at least second voltage divider, the transformer having a reactance that is substantially greater then the Thevenin resistance of the first and at least second voltage dividers.

2. The terminator of claim 1, wherein the transformer includes a pulse transformer.

3. The terminator of claim 1, wherein the first and at least second nodes include transmitter/receiver nodes.

4. The terminator of claim 3, wherein the first voltage level is an active voltage level for actively driving a transmitter/receiver and the second voltage level is an idle voltage level for permitting the transmitter/receiver to remain in a quiescent state.

5. The terminator of claim 4, wherein the second voltage level includes ground.

6. The terminator of claim 5, wherein the transmitter/receiver includes an Ethernet transmitter/receiver.

7. The terminator of claim 4, wherein the second voltage level includes voltage levels other than ground.

8. The terminator of claim 7, wherein the transmitter/receiver includes a Controller Area network transmitter/receiver.

9. The terminator of claim 8, wherein the first voltage level is around 3.75 volts DC and the second voltage level is around 1.25 volts DC.

10. The terminator of claim 1, wherein a magnitude of the reactance of the transformer is at least around ten times a magnitude of the Thevenin resistance of the first voltage divider and the at least second voltage divider.

11. A passive terminator between a plurality of nodes, the terminator comprising:

a first voltage divider configured to passively set a differential voltage level between a first voltage level and a second voltage level, the first voltage divider having a Thevenin resistance and being electrically connectable to a first transmitter/receiver node;

at least a second voltage divider configured to passively set the differential voltage level between the first voltage level and the second voltage level, the at least second voltage divider having the Thevenin resistance and being electrically connectable to at least a second transmitter/receiver node; and a pulse transformer electrically connected between the first voltage divider and the at least second voltage divider, the pulse transformer having a reactance that is substantially greater than the Thevenin resistance of the first and second voltage dividers.

12. The terminator of claim 11, wherein the first voltage level is an active voltage level for actively driving a transmitter/receiver and the second voltage level is an idle voltage level for permitting the transmitter/receiver to remain in a quiescent state.

13. The terminator of claim 12, wherein the second voltage level includes ground.

14. The terminator of claim 13, wherein the transmitter/receiver includes an Ethernet transmitter/receiver.

15. The terminator of claim 12, wherein the second voltage level includes voltage levels other than ground.

16. The terminator of claim 15, wherein the transmitter/receiver includes a Controller Area network transmitter/receiver.

17. The terminator of claim 16, wherein the first voltage level is around 3.75 volts DC and the second voltage level is around 1.25 volts DC.

18. The terminator of claim 11, wherein a magnitude of the reactance of the transformer is at least around ten times a magnitude of the Thevenin resistance of the first voltage divider and the at least second voltage divider.

19. A method for passively terminating a first node and at least a second node, the method comprising:

passively setting a differential voltage level between a first voltage level and a second voltage level with a first voltage divider having a Thevenin resistance at a first node;

passively setting the differential voltage level between the first voltage level and the second voltage level with at least a second voltage divider having a Thevenin resistance at at least a second node; and inductively coupling the first voltage divider and the at least second voltage divider with a transformer having an inductive reactance that is substantially greater than the Thevenin resistance of the first and at least second voltage dividers.

20. The method of claim 19, wherein inductively coupling includes providing a pulse transformer.

21. The method of claim 19, wherein the first and at least second nodes include transmitter/receiver nodes.

22. The method of claim 21, wherein the first voltage level is an active voltage level for actively driving a transmitter/receiver and the second voltage level is an idle voltage level for permitting the transmitter/receiver to remain in a quiescent state.

23. The method of claim 22, wherein the second voltage level includes ground.

24. The method of claim 23, wherein the transmitter/receiver includes an Ethernet transmitter/receiver.

25. The method of claim 22, wherein the second voltage level includes voltage levels other than ground.

26. The method of claim 25, wherein the transmitter/receiver includes a Controller Area network transmitter/receiver.

27. The method of claim 26, wherein the first voltage level is around 3.75 volts DC and the second voltage level is around 1.25 volts DC.

28. The method of claim 19, wherein a magnitude of the reactance of the transformer is at least around ten times a magnitude of the Thevenin resistance of the first voltage divider and the at least second voltage divider.

29. A system for transmitting and receiving signals to and from a plurality of transmitter/receiver nodes, the system comprising:

a first transmitter/receiver node;

a first voltage divider configured to passively set a differential voltage level between a first voltage level and a second voltage level, the first voltage divider having Thevenin resistance and being electrically connected to the first transmitter/receiver node;

at least a second transmitter/receiver node;

at least a second voltage divider configured to passively set the differential voltage level between the first voltage level and the second voltage level, the at least second voltage divider having the Thevenin resistance and being electrically connected to at least a second transmitter/receiver node; and a transformer electrically connected between the first voltage divider and the at least second voltage divider, the transformer having a reactance that is substantially greater than the Thevenin resistance of the first and at least second voltage dividers.

30. The system of claim 29, wherein the transformer includes a pulse transformer.

31. The system of claim 29, wherein the first voltage level is an active voltage level for actively driving a transmitter/receiver and the second voltage level is an idle voltage level for permitting the transmitter/receiver to remain in a quiescent state.

32. The system of claim 31, wherein the second voltage level includes ground.

33. The system of claim 32, wherein the transmitter/receiver includes an Ethernet transmitter/receiver.

34. The system of claim 31, wherein the second voltage level includes voltage levels other than ground.

35. The system of claim 34, wherein the transmitter/receiver includes a Controller Area network transmitter/receiver.

36. The system of claim 35, wherein the first voltage level is around 3.75 volts DC and the second voltage level is around 1.25 volts DC.

37. The system of claim 29, wherein a magnitude of the reactance of the transformer is at least around ten times a magnitude of the Thevenin resistance of the first voltage divider and the at least second voltage divider.

* * * * *